US012680944B2

(12) United States Patent
Brown

(10) Patent No.: US 12,680,944 B2
(45) Date of Patent: Jul. 14, 2026

(54) SENSING MOISTURE OR CORROSION

(71) Applicant: INTEGRITY ENGINEERING SOLUTIONS PTY LTD, Dunsborough (AU)

(72) Inventor: Ian Warren Brown, Dunsborough (AU)

(73) Assignee: INTEGRITY ENGINEERING SOLUTIONS PTY LTD, Dunsborough (AU)

( * ) Notice: Subject to any disclaimer, the term of this patent is extended or adjusted under 35 U.S.C. 154(b) by 0 days.

(21) Appl. No.: 19/119,219

(22) PCT Filed: Oct. 16, 2023

(86) PCT No.: PCT/AU2023/051020
§ 371 (c)(1),
(2) Date: Apr. 8, 2025

(87) PCT Pub. No.: WO2024/082002
PCT Pub. Date: Apr. 25, 2024

(65) Prior Publication Data
US 2026/0110620 A1 Apr. 23, 2026

(30) Foreign Application Priority Data
Oct. 16, 2022 (AU) ................................ 2022903029

(51) Int. Cl.
*G01N 17/04* (2006.01)
*G01N 27/04* (2006.01)
(52) U.S. Cl.
CPC ........... *G01N 17/04* (2013.01); *G01N 27/048* (2013.01)

(58) Field of Classification Search
CPC .......... G01B 7/32; G01N 17/04; G01N 27/12; G01N 27/20; G01N 27/205; G01R 15/12;
(Continued)

(56) References Cited

U.S. PATENT DOCUMENTS

| 4,338,563 A | 7/1982 | Rhoades et al. |
| 4,703,254 A | 10/1987 | Strommen |

(Continued)

OTHER PUBLICATIONS

International Search Report and Written Opinion of the International Searching Authority issued for International PCT Application No. PCT/AU2023/051020 on Nov. 6, 2023.
(Continued)

*Primary Examiner* — Kristina M Deherrera
*Assistant Examiner* — Gedeon M Kidanu
(74) *Attorney, Agent, or Firm* — Howson & Howson LLP

(57) ABSTRACT

An elongate sensor, system and method for detecting moisture and/or corrosion. The elongate sensor can include multiple conductors located alongside one another, or parallel with each other, not contacting each other and not making direct electrical contact between one another. Each conductor has a distinct pattern of alternating insulated and non-insulated portions. In each insulated portion, the Nth conductor is within an electrically non-conducting material forming Nth non-detecting portions. In each non-insulated portion, the Nth conductor is exposed or not electrically insulated forming Nth detecting portions. Each of the Nth detecting or non-detecting portions would have a single Nth unit length. Each Nth unit length is a distance equal to two to the power of N minus one first unit lengths, $2^{(N-1)}$ times the first unit length. Electrically conductive object provides a base conductor and/or the elongate sensor includes a base conductor.

37 Claims, 4 Drawing Sheets

(58) Field of Classification Search
CPC .... G01R 27/08; G01R 27/22; G01R 27/2676;
G01R 31/08; G01R 31/1227; H01B 7/02;
H01B 7/083
See application file for complete search history.

(56) References Cited

U.S. PATENT DOCUMENTS

| | | | |
|---|---|---|---|
| 5,036,287 A | 7/1991 | Serwatzky | |
| 5,243,297 A | 9/1993 | Perkins et al. | |
| 5,792,337 A | 8/1998 | Padovani et al. | |
| 9,719,951 B1 | 8/2017 | Woodbury et al. | |
| 9,910,003 B1* | 3/2018 | Lastinger | G01N 25/56 |
| 10,324,062 B2 | 6/2019 | Denenberg et al. | |
| 10,634,579 B1* | 4/2020 | Woodbury | G01M 3/165 |
| 10,809,217 B2 | 10/2020 | Sharma et al. | |
| 11,313,757 B2 | 4/2022 | Woodbury et al. | |
| 2011/0187393 A1 | 8/2011 | Vokey et al. | |
| 2012/0056634 A1* | 3/2012 | Bohon | G01N 27/121 |
| | | | 324/700 |

OTHER PUBLICATIONS

International Preliminary Report on Patentability issued for International PCT Application No. PCT/AU2023/051020 on Sep. 16, 2024.

\* cited by examiner

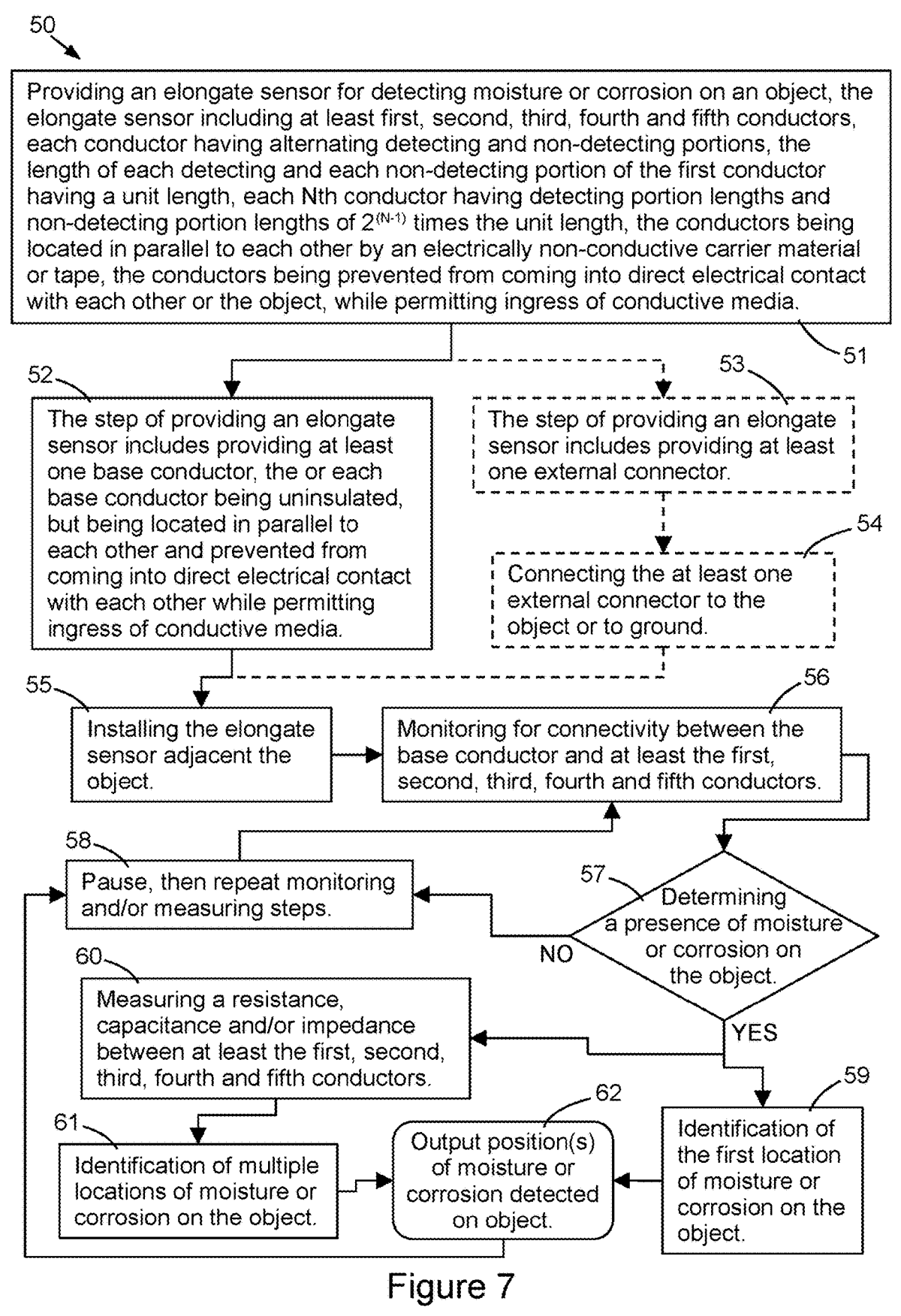

50

Providing an elongate sensor for detecting moisture or corrosion on an object, the elongate sensor including at least first, second, third, fourth and fifth conductors, each conductor having alternating detecting and non-detecting portions, the length of each detecting and each non-detecting portion of the first conductor having a unit length, each Nth conductor having detecting portion lengths and non-detecting portion lengths of $2^{(N-1)}$ times the unit length, the conductors being located in parallel to each other by an electrically non-conductive carrier material or tape, the conductors being prevented from coming into direct electrical contact with each other or the object, while permitting ingress of conductive media.

51

52

The step of providing an elongate sensor includes providing at least one base conductor, the or each base conductor being uninsulated, but being located in parallel to each other and prevented from coming into direct electrical contact with each other while permitting ingress of conductive media.

53

The step of providing an elongate sensor includes providing at least one external connector.

54

Connecting the at least one external connector to the object or to ground.

55

Installing the elongate sensor adjacent the object.

56

Monitoring for connectivity between the base conductor and at least the first, second, third, fourth and fifth conductors.

58

Pause, then repeat monitoring and/or measuring steps.

57

Determining a presence of moisture or corrosion on the object.

NO

YES

60

Measuring a resistance, capacitance and/or impedance between at least the first, second, third, fourth and fifth conductors.

61

Identification of multiple locations of moisture or corrosion on the object.

62

Output position(s) of moisture or corrosion detected on object.

59

Identification of the first location of moisture or corrosion on the object.

Figure 7

SENSING MOISTURE OR CORROSION

TECHNICAL FIELD

The present invention relates to sensing moisture and corrosion and in particular to a sensor, monitoring unit and system.

BACKGROUND

There are many situations in which sensing the position of moisture is required and there are many known sensors and systems of different types that detect the location of moisture.

For example, detecting corrosion of pipes that are surrounded in insulation or fireproofing is currently accomplished either by looking for moisture using a probe at individual points along the pipe or pipeline, or by having a sacrificial wire that corrodes due to the presence of moisture or other corrosive environments. These methods have significant drawbacks. For example, the use of a probe which can inherently only detect moisture in a small region adjacent each probe test site, can therefore only provide results for local regions, not the whole length of pipe. If tested away from a point of moisture, or away from a point of corrosion, the test results will be misleading.

Arrangements using localised test probes are disclosed for example in U.S. Pat. No. 4,703,254 which uses permanently fixed probes spaced along a pipe and U.S. Pat. No. 5,243,297 which uses sacrificial and protected wires in parallel in the probe to detect corrosion conditions at the location of each probe. Conversely, the sacrificial wire type arrangement, such as described for example in U.S. Pat. No. 4,338,563 or 5,036,287, can indicate a problem somewhere in the length of pipe, but not where along that length the problem may be.

To overcome these drawbacks, it is known to generate an electromagnetic waveform, pass it along an electromagnetic waveguide adjacent the pipe, then analyse a reflected portion of the waveform, such as in U.S. Pat. No. 10,809,217. The waveguide includes a sacrificial portion and analysis of the reflected waveform enables the location of corrosion of the sacrificial portion of the waveguide to be determined. Corrosion is said to be detected when located at one location, or when located at multiple locations, given sufficient signal processing.

The condition of the material of an object such as a pipe can be characterized using an electromagnetic field sensor. As disclosed in U.S. Pat. No. 10,324,062, the sensor and associated data processing system can, once calibrated, detect features such as the sizes of cracks or corrosion when excited by a signal generator.

Another known form of moisture detection is disclosed in U.S. Pat. Nos. 9,719,951 and 11,313,757. These arrangements utilise at least three conductors in parallel, with one of the conductors having a different resistance to the other conductors. When a liquid extends between the conductors, the difference between firstly the impedance through a pair of conductors and the liquid and secondly the impedance of through another pair of conductors and the liquid may then be used to determine the position of the liquid along a length of the conductors. Similar methods may be used to determine an area of a liquid with respect to the conductors.

None of the known solutions provide a reliable and accurate solution to the problem of identifying moisture or corrosion. In the case of the waveform arrangements, they require complex equipment and can be affected by external variations in environment such as proximity to the pipe or other object. In the case of the resistance methods, the large variation in moisture conductivity presents a significant obstacle and it is not possible to distinguish the location of more than one incident of moisture or delineate between a single location of moisture and multiple locations of moisture.

It is to be understood that, if any prior art is referred to herein, such reference does not constitute an admission that the prior art forms a part of the common general knowledge in the art, in Australia or any other country.

SUMMARY

According to a first aspect of the present invention, there is provided an elongate sensor for a system for detecting moisture and/or corrosion, the elongate sensor including at least a first conductor, a second conductor and a third conductor, each of the at least first, second and third conductors being located in parallel to each other by an electrically non-conductive carrier material to prevent the conductors from coming into direct electrical conductive contact with each other or external conductive surfaces, while permitting ingress of conductive media; the first conductor being exposed or electrically non-insulated for a first unit length forming an initial first detecting portion, then alternately being electrically insulated for a distance equal to the first unit length forming first non-detecting portions or being electrically non-insulated for a distance equal to the first unit length forming additional first detecting portions of the first conductor; the second conductor being electrically insulated for a distance equal to a second unit length minus the first unit length forming an initial second non-detecting portion, then alternately being electrically non-insulated for a distance equal to the second unit length forming second detecting portions or being electrically insulated for a distance equal to the second unit length forming additional second non-detecting portions of the second conductor, the second unit length being double the first unit length; the third conductor being electrically insulated for a distance equal to a third unit length minus the first unit length forming an initial third non-detecting portion, then alternately being electrically non-insulated for a distance equal to the third unit length forming third detecting portions or being electrically insulated for a distance equal to the third unit length forming non-detecting portions of the third conductor, the third unit length being double the second unit length.

The conductive media may, for example, be conductive fluids such as water or water and conductive particles such as small rust particles.

Preferably, the elongate sensor may have a length greater than the third unit length.

The at least a first conductor, a second conductor and a third conductor further may include a base conductor; the base conductor being exposed or non-insulated and being located parallel to the first, second and third conductors by the non-conductive material. The non-conductive material may locate the conductors substantially parallel physically, or at least hold the conductors close together while preventing the base conductor from coming into direct electrical conductive contact with any of the at least the first, second and third conductors and optionally also any external conductive surfaces such as adjacent metal surfaces, while permitting ingress of conductive media to the base conductor.

The first, second and third conductors may be alternating portion conductors, since they each have alternating non-detecting portions and detecting portions, unlike the base conductor.

The base conductor may be corrodible. Additionally, or alternatively, the base conductor may comprise multiple parallel non-insulated conductors, some of which may differ in size and/or corrodibility. For example, the or one of the base conductor(s) may be corrosion resistant.

At least one of the at least a first conductor, a second conductor and a third conductor may be resistant to corrosion. For example, at least one of the conductors may be stainless steel.

At least one of the at least a first conductor, a second conductor and a third conductor may further include a resistor in series with the respective conductor. The resistor for one of the conductors may be different from the resistor of another of the conductors, or each conductor may utilise a resistor of a different value. Alternatively, or additionally, at least two of the at least a first conductor, a second conductor and a third conductor may have different resistance. For example, the first conductor may be made from a different material or have a different cross-section from the second conductor.

Alternatively, at least one of the at least a first conductor, a second conductor and a third conductor further includes at least two resistors in series with the respective conductor, equispaced along the respective conductor. For example, a two series set of elongate sensors may comprise a first elongate sensor, a second elongate sensor and a third elongate sensor, with a respective first resistor between one of each of the conductors of the first elongate sensor, and the respective conductor of the second elongate sensor, and with a respective second resistor between one of each of the conductors of the second elongate sensor, and the respective conductor of the third elongate sensor. Alternatively, the conductors of the first elongate sensor may have different resistances to the conductors of the second elongate sensor by utilising different material or different cross-sectional areas. Similarly, any additional elongate sensors may have conductors of different resistances to the other elongate sensors.

The first unit length may be up to and including 1 metre, preferably up to and including 2 metres; or more preferably, up to and including 4 metres. Alternatively, the first unit length may be greater than 4 metres.

The elongate sensor may be held, adhered or fixed under a substantially horizontal object and/or spiraled around a substantially vertical object. For example, a set of at least two elongate sensors may be spiraled around the object. The set of two spiraled sensors may for example, be in parallel with each other, such as on opposite sides of any given cross-section of the object, or may alternatively criss-cross each other.

The elongate sensor may include a fourth conductor; the fourth conductor being electrically insulated for a distance equal to a fourth unit length minus the first unit length forming an initial fourth non-detecting portion, then alternately being electrically non-insulated for a distance equal to the fourth unit length forming fourth detecting portions or being electrically insulated for a distance equal to the fourth unit length forming fourth non-detecting portions of the fourth conductor, the fourth unit length being double the third unit length. An alternative definition of the fourth unit length is that it may be eight times the first unit length, or another alternative definition is that it may be $2^{(4-1)}$ times the first unit length. Preferably, the elongate sensor may have a length greater than the fourth unit length.

The elongate sensor may include an Nth conductor; the Nth conductor being electrically insulated for a distance equal to an Nth unit length minus the first unit length forming an initial Nth non-detecting portion, then alternately being electrically non-insulated for a distance equal to the Nth unit length forming Nth detecting portions or being electrically insulated for a distance equal to the Nth unit length forming Nth non-detecting portions of the Nth conductor, the Nth unit length being $2^{(N-1)}$ times the first unit length. Preferably, the elongate sensor may have a length greater than the Nth unit length.

The non-conductive carrier material and the conductors may be woven together. This can assist with locating the conductors close together while still preventing the conductors from making direct electrical contact with each other or external conductive surfaces.

Alternatively, the non-conductive carrier material may be a strip or tape to which the conductors are fastened, such as adhered, or printed. If the conductors are printed onto the non-conductive carrier, the non-detecting portions may be printed in non-conductive material over the conductors in the appropriate portions.

The elongate sensor may include a detector unit connected electrically to each conductor. The detector unit may detect electrical conductivity between the conductors. Alternatively, or additionally, the detector unit may measure electrical resistance, impedance and/or capacitance between the conductors. The detector unit may be electrically connected to one end of each conductor, or to both ends of each conductor. The detector unit may include inputs for connecting to the object to use to object as at least a portion of the base conductor. The detector unit may include an output. The output may be wired and/or wireless. The output may optionally include a visual indicator.

Another aspect of the present invention provides an elongate sensor for a system for detecting moisture and/or corrosion of an object, the elongate sensor including at least a first conductor, a second conductor and a third conductor, each of the at least first, second and third conductors being located in parallel to each other by an electrically non-conductive carrier material to prevent the conductors from coming into direct electrical conductive contact with each other or external conductive surfaces while permitting ingress of conductive media; the first conductor being electrically insulated for a first unit length forming an initial first non-detecting portion, then alternately being electrically non-insulated for a distance equal to the first unit length forming first detecting portions or being electrically insulated for a distance equal to the first unit length forming additional first non-detecting portions of the first conductor; the second conductor being electrically insulated for a distance equal to a second unit length forming an initial second non-detecting portion, the second unit length being double the first unit length, then alternately being electrically non-insulated for a distance equal to the second unit length forming second detecting portions or being electrically insulated for a distance equal to the second unit length forming additional second non-detecting portions of the second conductor; the third conductor being electrically insulated for a distance equal to a third unit length, the third unit length being double the second unit length forming an initial third non-detecting portion, then alternately being electrically non-insulated for a distance equal to the third unit length forming third detecting portions or being electrically insulated for a distance equal to the third unit length forming non-detecting portions of the third conductor; the elongate sensor having a sensing region beginning at the end of the initial first non-detecting portion.

The conductive media may, for example, be conductive fluids such as water or water and conductive particles such as small rust particles.

An alternative definition of the third unit length may be that it is four times the first unit length, or may be that it is $2^{(3-1)}$ times the first unit length. Preferably, the elongate sensor may have a length greater than the third unit length, otherwise the third conductor would be insulated for the entire length of the elongate sensor.

The elongate sensor may further include a base conductor, the base conductor being exposed or non-insulated and being located parallel to the first, second and third conductors by the non-conductive material. Again, the non-conductive material is also used to prevent the base conductor from coming into direct electrical conductive contact with any of the at least the first, second and third conductors and optionally also any external conductive surfaces such as adjacent metal surfaces.

The elongate sensor may include an Nth conductor, the Nth conductor being electrically insulated for a distance equal to an Nth unit length forming an initial Nth non-detecting portion, the Nth unit length being $2^{(N-1)}$ times the first unit length, then alternately being electrically non-insulated for a distance equal to the Nth unit length forming Nth detecting portions or being electrically insulated for a distance equal to the Nth unit length forming Nth non-detecting portions of the Nth conductor. Preferably, the elongate sensor may have a length greater than the Nth unit length.

Another aspect of the present invention provides a system for detecting moisture and/or corrosion of an object, the system including at least one elongate sensor and a sensor monitoring unit: the elongate sensor including at least a first conductor, a second conductor and a third conductor, each of the at least first, second and third conductors being located in parallel to each other by a non-conductive carrier material to prevent the conductors from coming into direct electrical conductive contact with each other or external conductive surfaces while permitting ingress of conductive media; the first conductor being exposed or electrically non-insulated for a first unit length forming an initial first detecting portion, then alternately being electrically insulated for a distance equal to the first unit length forming first non-detecting portions or being electrically non-insulated for a distance equal to the first unit length forming additional first detecting portions of the first conductor; the second conductor being electrically insulated for a distance equal to a second unit length minus the first unit length forming an initial second non-detecting portion, then alternately being electrically non-insulated for a distance equal to the second unit length forming second detecting portions or being electrically insulated for a distance equal to the second unit length forming non-detecting portions of the second conductor, the second unit length being double the first unit length; the third conductor being electrically insulated for a distance equal to a third unit length minus the first unit length forming an initial third non-detecting portion, then alternately being electrically non-insulated for a distance equal to the third unit length forming third detecting portions or being electrically insulated for a distance equal to the third unit length forming non-detecting portions of the third conductor, the third unit length being double the second unit length; the monitoring unit being connectable to each of the at least first, second and third conductors individually and being configured to detect electrical connectivity or conductivity between any pair of the at least first, second and third conductors.

The conductive media may, for example, be conductive fluids such as water or water and conductive particles such as small rust particles. An alternative definition of the length of the initial second non-detecting portion may be one first unit length. Similarly, an alternative definition of the length of the initial third non-detecting portion may be that it is equal to the first unit length added to the second unit length. Similarly, an alternative definition of the third unit length is that it may be four times the first unit length. Preferably, the elongate sensor may have a length greater than the third unit length.

Another aspect of the present invention provides a system for detecting moisture and/or corrosion of an object, the system including at least one elongate sensor and a monitoring unit: the elongate sensor including at least a first conductor, a second conductor and a third conductor, each of the at least first, second and third conductors being located in parallel to each other by an electrically non-conductive carrier material to prevent the conductors from coming into direct electrical conductive contact with each other or external conductive surfaces, while permitting ingress of conductive media; the first conductor being exposed or electrically non-insulated for a first unit length forming an initial first detecting portion, then alternately being electrically insulated for a distance equal to the first unit length forming first non-detecting portions or being electrically non-insulated for a distance equal to the first unit length forming additional first detecting portions of the first conductor; the second conductor being electrically insulated for a distance equal to a second unit length minus the first unit length forming an initial second non-detecting portion, then alternately being electrically non-insulated for a distance equal to the second unit length forming second detecting portions or being electrically insulated for a distance equal to the second unit length forming non-detecting portions of the second conductor, the second unit length being double the first unit length; the third conductor being electrically insulated for a distance equal to a third unit length minus the first unit length forming an initial third non-detecting portion, then alternately being electrically non-insulated for a distance equal to the third unit length forming third detecting portions or being electrically insulated for a distance equal to the third unit length forming non-detecting portions of the third conductor, the third unit length being double the second unit length; the monitoring unit being directly or preferably indirectly connected, in use, to each of the at least first, second and third conductors individually and being configured to detect electrical conductivity between any pair of the at least first, second and third conductors.

The conductive media may, for example, be conductive fluids such as water or water and conductive particles such as small rust particles. An alternative definition of the length of the initial second non-detecting portion may be one first unit length. Similarly, an alternative definition of the length of the initial third non-detecting portion may be that it is equal to the first unit length added to the second unit length. Similarly, an alternative definition of the third unit length is that it may be four times the first unit length. Preferably, the elongate sensor may have a length greater than the third unit length.

The monitoring unit may be indirectly connected to the conductors of the elongate sensor in that, the elongate sensor may include a detecting unit directly connected to the conductors of the elongate sensor and providing binary, and/or processed and converted data to the monitoring unit.

The system may further include, in use, a base conductor wherein the monitoring unit is configured to detect electrical conductivity between any pair of the conductors, including the base conductor and the at least first, second and third conductors. The base conductor may be included in the elongate sensor. The base conductor may be non-insulated and may be located parallel to the at least first, second and third conductors by the non-conductive carrier material. Additionally, the base conductor may comprise multiple wires of differing diameters and/or of differing materials. At least one of, preferably each of the multiple wires of such a base conductor may be non-insulated. Additionally, or alternatively, the base conductor may be or include the object.

In use, the elongate sensor may be spiraled around or held adjacent or against an underside of an object, the object being conductive and forming, or being used as, the base conductor. The object may be a pipe, structure or equipment.

The monitoring unit and/or any detecting unit may convert detected electrical connectivity or conductivity between the base conductor and the at least first, second and third conductors into a decimal number of first unit lengths or into a distance. Such electrical connectivity or conductivity between conductors is an indication of corrosion or moisture at a distance corresponding to a position or region that is of a length of the first unit length and is located at a number of unit lengths indicated in binary or base two by the connectivity or lack of connectivity of the at least first, second and third conductors.

The monitoring unit and/or any detecting unit may detect electrical resistance between individual pairs of the conductors, and may determine a location of at least one position or region of corrosion or moisture. The at least one position or regions may be two or more positions or regions. The individual pairs of conductors may be selected from the base conductor and the at least first, second and third conductors. The location of multiple regions (or sections, having a length of the first unit length) within which there is corrosion or moisture can be determined using a function of the relative resistance between pairs of the at least base, first, second and third conductors.

The monitoring unit and/or a detecting unit of the elongate sensor may be connected to a first end and a second end of each of the conductors and may detect and compare electrical resistance, impedance and/or capacitance measured from the first end to electrical resistance, impedance and/or capacitance measured at the second end. This may provide further improvement in the location of multiple regions of moisture and/or corrosion on one elongate sensor.

The monitoring unit may be directly connected to the conductors of the elongate sensor. Alternatively, the monitoring unit may be indirectly connected to the conductors of the elongate sensor, the elongate sensor including a detector unit, the monitoring unit being connected to the detector unit of the elongate sensor. The monitoring unit may be connected to the detector unit by a wired or wireless connection.

The monitoring unit may obtain a reading from the elongate sensor at a predetermined interval of time. For example, the monitoring unit may receive an output signal from the elongate sensor at the expiry of every predetermined interval of time. Alternatively, the monitoring unit may measure connectivity, conductivity, resistance, impedance and/or capacitance between pairs of conductors of the elongate sensor at the expiry of every predetermined period of time.

The monitoring unit may convert detected electrical connectivity or conductivity between the pairs of conductors into a decimal number of first unit lengths or into a distance. Electrical connectivity or electrical conductivity between the pairs of conductors is an indication of corrosion or moisture at a distance corresponding to a position or region that is of a length of the first unit length and is located at a number of unit lengths indicated in binary or base two by the connectivity or lack of connectivity of the at least first, second and third conductors.

The system may further include a base conductor. The base conductor may be at least one additional conductor in the elongate sensor. Alternatively, or additionally, in use, the base conductor may be the object. The monitoring unit may be configured to measure an electrical resistance, impedance and/or capacitance between individual pairs of the conductors, including the base conductor and the first, second and third conductors.

The monitoring unit may convert electrical resistance between the pairs of the at least first, second and third conductors to determine a location of at least one position or region of corrosion or moisture. The at least one position or region of corrosion or moisture may be two or more positions or regions. The location(s) may be determined down to a region or section having a length of the first unit length, the location(s) of the or each region or section being determined by a binary or base-two indication of connectivity between the pairs of conductors and/or a relative resistance, capacitance or impedance between the individual pairs of conductors.

The monitoring unit and/or a detecting unit of the elongate sensor may be connected to a first end and a second end of each of the conductors and may detect and compare electrical resistance, impedance and/or capacitance between pairs of conductors, measured from the first end to electrical resistance, impedance and/or capacitance between the respective pairs of conductors measured at the second end. This may provide further improvement in the location of multiple regions of moisture and/or corrosion on one elongate sensor.

The monitoring unit may periodically measure conductivity and/or resistance, impedance and/or capacitance in the at least one elongate sensor, the sensor monitoring unit logging or tracking the time periods that a detecting portion is detecting moisture. Preferably such logging or tracking of, for example frequency of occurrence and average duration, or of a trend in duration that a detecting portion of an elongate sensor is detecting moisture may be used to identify risk of corrosion at a particular location. The system may then identify the most at-risk locations. A repair priority for locations may be set. Resistance, impedance and/or capacitance may be measured to identify risk of corrosion, with conductivity used to indicate a sharp increase in risk of corrosion.

The at least one elongate sensor may include multiple elongate sensors on multiple monitored objects, measured conductivity and/or resistance, impedance and/or capacitance from each sensor being transmitted to the monitoring unit. The measured data from each elongate sensor may be transmitted to the monitoring unit over a wired or wireless connection. Preferably all identified regions of moisture or potential corrosion across all monitored objects may be risk ranked.

The at least one elongate sensor may be placed underneath a covering on the object, for example between the object and the covering on the object. The object may be a pipe, pipeline, equipment or structure. The elongate sensor may preferably be placed to detect if there is moisture ingress under the covering so that a potential issue can be rectified. The system may detect an amount of time that moisture is present. The system may detect if any non-conductive protective coating on the object has been compromised, i.e. the coating has failed or is beginning to fail, such as anything from a pin-hole upwards that impairs the efficacy of the protective coating, or renders it ineffective.

The non-conductive coating may for example be a paint or an anti-corrosion coating including a mechanical protection layer, a thermosetting plastic layer, or a refractory coating layer. The elongate sensor may typically be underneath the object where moisture may collect, and may be placed over the coating, but inside the covering. However, where multiple layers of coating are used, the sensor may be located between the layers of coating.

The covering may be insulation, fireproofing or a mechanical protection layer, thermosetting plastic layer, refractory or weight layer for example.

Another aspect of the present invention provides a method of detecting moisture or corrosion on an object, the method comprising: providing an elongate sensor including at least first, second, third, fourth and fifth conductors, each conductor having alternating exposed or electrically non-insulated detecting and electrically insulated non-detecting portions, the length of each detecting and each non-detecting portion of the first conductor having a unit length, each Nth conductor having detecting portion lengths and non-detecting portion lengths of $2^{(N-1)}$ times the unit length, the conductors being located in parallel to each other by an electrically non-conductive carrier material or tape, the conductors being prevented from coming into direct electrical contact with each other or the object, while permitting ingress of conductive media.

Providing an elongate sensor may include providing at least one base conductor, the or each base conductor being uninsulated, but being located in parallel to each other and prevented from coming into direct electrical contact with each other while permitting ingress of conductive media.

Alternatively, or additionally, providing an elongate sensor may include providing at least one external connector. The method may further include connecting the external connector to the object or to ground, the external connector forming a portion of an external base conductor which forms part of the or a base conductor.

The method may further include installing the elongate sensor adjacent the object. For example, the elongate sensor may be installed adjacent the object and under a covering around the object.

The method may further include monitoring for connectivity between the base conductor and at least the first, second, third, fourth and fifth conductors.

The method may further include determining a presence of moisture or corrosion on the object: if no moisture or corrosion is detected on the object, then after a pause of a predetermined time period, the monitoring for connectivity is repeated; if moisture or corrosion is detected on the object, then calculating and reporting the position of said moisture or corrosion on the object.

Alternatively, if moisture or corrosion is detected on the object, then the method may include measuring a resistance, capacitance and/or impedance for any or each connection between the base conductor and the at least first, second, third, fourth and fifth conductors calculating and reporting at least one position of said moisture or corrosion on the object.

Alternatively, once the elongate sensor is installed, the method may include measuring a resistance, capacitance and/or impedance between at least the first, second, third, fourth and fifth conductors; determining a presence of moisture or corrosion on the object: if no moisture or corrosion is detected on the object, then after a pause of a predetermined time period, the measuring a resistance, capacitance and/or impedance is repeated; if moisture or corrosion is detected on the object, then calculating and reporting at least one position of said moisture or corrosion on the object.

The method may, after calculating and reporting the position moisture or corrosion on the object, further include: pausing for a predetermined period of time; then repeating the monitoring and/or measuring steps.

BRIEF DESCRIPTION OF THE DRAWINGS

One or more embodiments or examples of the present invention will hereinafter be described with reference to the accompanying Figures, in which:

FIG. 7 is a flow diagram of a method according to another aspect of the present invention.

DESCRIPTION OF PREFERRED EMBODIMENT(S)

Figures 1, 2:
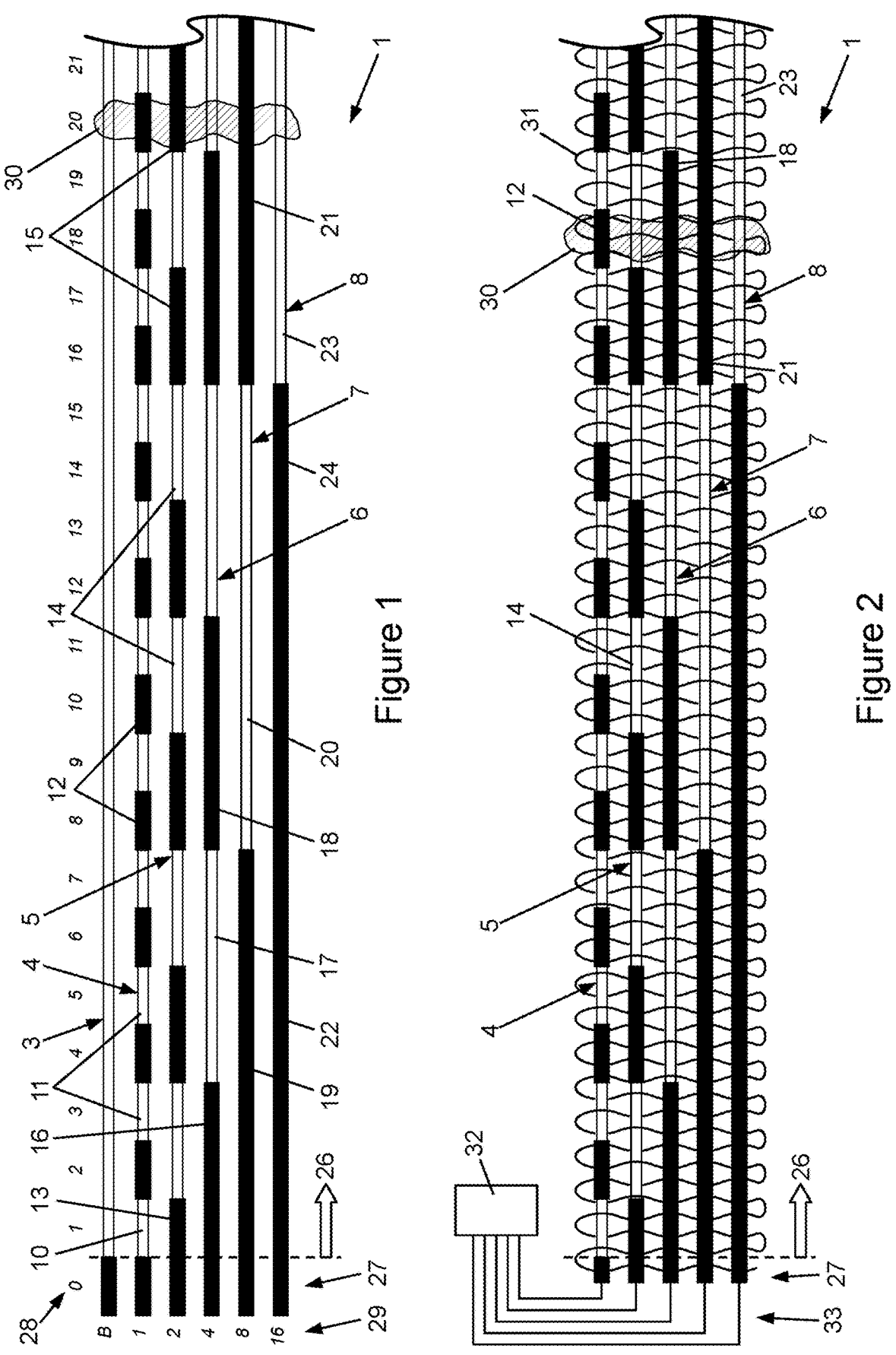
FIG. 1 is a diagrammatic representation of an elongate sensor according to an aspect of the present invention.
FIG. 2 is a diagrammatic representation of an elongate sensor according to another aspect of the present invention.

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

Referring initially to FIG. 1 there is an elongate sensor 1. The elongate sensor 1 includes multiple conductors 3, 4, 5, 6 located alongside one another or parallel with each other, such that the conductors do not contact each other, so do not make direct electrical contact between one another.

The first conductor 4 (i.e. the first of the alternating portion conductors) has alternating insulated and non-insulated portions. In each non-insulated portion, the first conductor 4 is exposed or electrically non-insulated forming first detecting portions 11. In each insulated portion, the first conductor 4 is enclosed or encased within an electrically non-conductive material forming first non-detecting portions 12. Each of the first detecting or non-detecting portions 11, 12 has a single first unit length.

Similarly, the second conductor 5 (i.e. the second of the alternating portion conductors) has alternating insulated and non-insulated portions. In each insulated portion, the second conductor 5 is enclosed or encased within an electrically non-conductive material forming second non-detecting portions 15. In each non-insulated portion, the second conductor 5 is exposed or not electrically insulated forming second detecting portions 14. Each of the second detecting or non-detecting portions 14, 15 has a single second unit length. Each second unit length is a distance equal to two first unit lengths.

Similarly, the third conductor 6 (i.e. the third of the alternating portion conductors) has alternating insulated and non-insulated portions. In each insulated portion, the third conductor 6 is enclosed or encased within an electrically non-conductive material forming third non-detecting portions 18. In each non-insulated portion, the third conductor 6 is exposed or not electrically insulated forming third detecting portions 17. Each of the third detecting or non-detecting portions 17, 18 has a single third unit length. Each third unit length is a distance equal to two second unit lengths or equal to four first unit lengths.

Similarly, the fourth conductor 7 (i.e. the fourth of the alternating portion conductors) has alternating insulated and non-insulated portions. In each insulated portion, the fourth conductor 7 is enclosed or encased within an electrically non-conductive material forming fourth non-detecting portions 21. In each non-insulated portion, the fourth conductor 6 is exposed or not electrically insulated forming fourth detecting portions 20. Each of the fourth detecting or non-detecting portions 20, 21 has a single fourth unit length. Each fourth unit length is a distance equal to two third unit lengths, or equal to four second unit lengths or equal to eight first unit lengths.

Similarly, the fifth conductor 8 (i.e. the fifth of the alternating portion conductors) has alternating insulated and non-insulated portions. In each insulated portion, the fifth conductor 8 is enclosed or encased within an electrically non-conductive material forming fifth non-detecting portions 24. In each non-insulated portion, the fifth conductor 8 is exposed or not electrically insulated forming fifth detecting portions 23. Each of the fifth detecting or non-detecting portions 23, 24 has a single fifth unit length. Each fifth unit length is a distance equal to two fourth unit lengths, or equal to four third unit lengths, or equal to eight second unit lengths or equal to sixteen first unit lengths.

Following this pattern, as additional conductors are added, the Nth conductor would have alternating insulated and non-insulated portions. In each insulated portion, the Nth conductor would be enclosed or encased within an electrically non-conductive material forming Nth non-detecting portions 24. In each non-insulated portion, the Nth conductor would be exposed or not electrically insulated forming Nth detecting portions. Each of the Nth detecting or non-detecting portions would have a single Nth unit length. Each Nth unit length is a distance equal to two to the power of N minus one first unit lengths, i.e. $2^{(N-1)}$ times the first unit length.

The sensing region 26 of the elongate sensor 1 begins at the start of the initial of the first detecting portions 11 on the first conductor 4. Prior to that, in FIG. 1 there is shown an initial or zero portion 27, in which the first, second, third, fourth and fifth conductors are all insulated.

So, considering now only those portions of the conductors within the sensing region 26 of the elongate sensor, the first conductor 4 is initially non-insulated in the initial first detecting portion 10 which has a length of one first unit length. Also in this case, the second conductor 5 is initially insulated with an initial second non-detecting portion 13 having a length of the second unit length minus the first unit length which is equivalent to one first unit length. The third conductor 6 is initially insulated with an initial third non-detecting portion 16 having a length of the third unit length minus the first unit length, which is equivalent to three times the first unit length. The fourth conductor 7 is initially insulated with an initial fourth non-detecting portion 19 having a length of the fourth unit length minus the first unit length, which is equivalent to seven times the first unit length. The fifth conductor 8 is initially insulated with an initial fifth non-detecting portion 22 having a length of the fifth unit length minus the first unit length, which is equivalent to fifteen times the first unit length, measured from the start of the sensing region 26 of the elongate sensor. Similarly, an Nth conductor would have an initial Nth non-detecting portion which is electrically insulated for a distance equal to the Nth unit length, minus the first unit length, which is equal to two to the power of N minus one, times the first unit length minus one first unit length, i.e. $(2^{(N-1)}-1)$ times the first unit length.

Each of the first, second, third, fourth, fifth up to Nth conductors of the elongate sensor may be referred to as an alternating portion conductor as each has alternating detecting (or exposed or non-insulated) portions and non-detecting (or insulated) portions.

The elongate sensor can use an electrically conductive object as a base conductor and/or a base conductor 3 can be provided as part of the elongate sensor as shown in FIG. 1. The base conductor 3, when provided as part of the elongate sensor, is exposed or not electrically insulated, but is held close to the other conductors (such as the first, second, third fourth and fifth conductors 4, 5, 6, 7, 8) while not being in direct contact with any of the other conductors.

When moisture or corrosion 30 occurs, the fluid or rust particles for example, can bridge across the conductors as shown in FIG. 1. The moisture or corrosion is shown occurring at an insulated, or first non-detecting portion 12 of the first conductor 4, at an insulated or second non-detecting portion 15 of the second conductor 5, at an exposed or electrically non-insulated portion or third detecting portion 17 of the third conductor 6, at an insulated or fourth non-detecting portion 21 of the fourth conductor 7, and at an exposed or electrically non-insulated portion or fifth detecting portion 23 of the fifth conductor 8. There is therefore electrical connectivity between the base conductor 3, the third conductor 6 and the fifth conductor 8.

The portions of the first, second, third, fourth and fifth conductors within the sensing region 26 of the elongate sensor 1 form a base-two or binary distance measurement arrangement, measuring distance along the elongate sensor in first unit lengths. Therefore, the length at which the moisture or corrosion is present can be measured with a resolution of the first unit length using the elongate sensor. The first conductor 4 indicates a value of one, the second conductor 5 indicates a value of two, the third conductor 6 indicates a value of four, the fourth conductor 7 indicates a value of eight, the fifth conductor indicates a value of sixteen. So, the value indicated by an Nth conductor would be $2^{(N-1)}$. FIG. 1 shows letter and numbers 29 indicating the wire functions, so the value indicated by a conductor as described immediately above, or in the case of the base conductor 3, the letter "B".

So when the moisture or corrosion 30 bridges the conductors as shown in FIG. 1, where the third and fifth conductors are exposed, the presence of continuity between the base conductor 3 and one of the third detecting portions 17 of the third conductor 6 indicates a value of four and the presence of continuity between the base conductor 3 and one of the fifth detecting portions 23 of the fifth conductor 8 indicates a value of sixteen. The elongate sensor therefore provides continuity between the conductors which indicate moisture or corrosion in the twentieth unit distance from the start of the sensing region along the elongate sensor, because in this example, the distance is four plus sixteen, i.e. twenty units, or twenty times the first unit length. As discussed above, the first unit length is the individual length of each of the first detecting portions and each of the first non-detecting portions.

An alternate method of interpretation is to use binary numbers and interpret a lack of conduction as a zero and conduction as a one. The first conductor is the first unit in the binary number, the second the second unit and so forth. In the case of the moisture location 30 the binary number formed by the conduction is "10100", which converts to the integer 20, indicating that the moisture or corrosion is located 20 first unit lengths along the elongate sensor.

FIG. 1 includes a decimal scale 28 providing a count of the unit length portions. This is provided for clarity in the drawing, although it is possible to optionally include a decimal scale marked on the elongate sensor. In this way, when moisture is detected under insulation on a pipe for example, at a certain length along the elongate sensor fixed to the pipe, a small amount of insulation may be removed or pulled back to allow such a visual distance marking to be read to verify that the correct portion of pipe has been found, before removing a length of insulation to uncover the moisture or corrosion.

The conductors can be kept apart on the adhesive surface of a tape or similar strip of electrically non-conductive carrier material, the adhesive surface also providing at least a portion of the location of the conductors relative to the object, at least during initial application or installation. The conductors can alternatively be bonded or otherwise fixed to the tape and the tape then held against the object by any known means. Alternatively, or additionally, the conductors can be held close together, but preventing from directly contacting each other, by weaving together with a non-conductive thread, fibre or yarn.

Regardless of how the elongate sensor is constructed, the individual conductors must be prevented from directly contacting each other as any unintentional electrical conduction between the conductors can generate false indications of moisture or corrosion where none is occurring. This requirement can include holding or locating the conductors adjacent to each other or parallel with each other, while preventing contact between any of the conductors, including the base conductor and the other conductors, whether the base conductor be an additional conductor in the elongate sensor as shown in FIG. 1, or the object such as a pipe or pipeline. The presence of moisture, such as conductive fluids, and/or corrosion such as small rust particles, must be able to generate connectivity between the conductors to enable indication of the location of the moisture or corrosion as described above.

Once corrosion of a metal object occurs, the moisture will then contain a greater number of ions, such as iron oxide for an iron or steel pipe where for example the moisture is water.

FIG. 2 shows the first, second, third, fourth and fifth conductors 4, 5, 6, 7, 8 woven together with a non-conductive carrier material 31, such as a thread, fibre or yarn of non-conductive material. The non-conductive carrier material is also preferably hydrophobic, such as fibreglass or polymer thread. While a base conductor can be woven into the elongate sensor, it is omitted in FIG. 2 as the object against which the elongate sensor is held or fixed such as a metal pipe, can form the base conductor.

The weave of the non-conductive carrier material 31 with the first, second, third, fourth and fifth conductors 4, 5, 6, 7, 8 must prevent the conductors from touching or directly electrically contacting each other while maintaining the conductors close to each other, essentially in parallel, and preventing direct electrical contact between the first, second third, fourth and fifth conductors and the base conductor or any other external conductive surfaces. The weave must also permit ingress of conductive media, for example conductive fluids such as water and conductive particles such as small rust particles, so that such conductive media can generate conduction between conductors that are exposed or non-insulated at a point of moisture or corrosion.

The portion of the elongate sensor 1 before the start of the sensing region 26, such as the zero portion 27 of the elongate sensor, can be of any length including zero. In FIG. 2, the zero portion 27 is shown with a length of less than one unit length. Electrical connections 33 are required for each conductor to enable connection to connectivity detecting circuitry, resistance measuring circuitry and/or other sensing circuitry. In FIG. 2, the elongate sensor 1 includes a detector unit 32, in electrical communication with the first, second, third, fourth and fifth conductors 4, 5, 6, 7, 8 using the electrical connections 33.

In FIG. 2, the moisture or corrosion 30 generates connectivity between the base conductor (not shown) and the exposed or non-insulated portions of the second and fifth conductors 5 and 8, i.e. one of the second detecting portions 14 and one of the fifth detecting portions 23. This indicates connectivity in conductors of binary magnitude two and sixteen, i.e. in the eighteenth first unit length from the start of the sensing region of the elongate sensor. Alternatively, the binary number may be interpreted as "10010", corresponding to an integer value of 18.

The detector unit 32 can convert sensed connectivity or sensed resistance between the conductors into an output signal indicative of the distance along the elongate sensor of any moisture or corrosion in a number of first units and/or as a length for example in metres. This can be output into software as a binary number or as the converted number which can relate directly to a distance or location. The detector unit can provide the output signal on a wired and/or on a wireless connection. For example, the detector unit can wirelessly transmit the output signal to a monitoring system. The monitoring system can be a central monitoring system. Such a monitoring system can communicate with multiple elongate sensors, for example in different locations around an industrial plant.

The elongate sensor 1 can be part of a system for detecting moisture and/or corrosion. The system can include at least one sensor monitoring unit for receiving output signals from at least one elongate sensor or detector unit. For example, the monitoring unit can be connected directly to each of the conductors of an elongate sensor and configured to detect electrical conductivity or electrical resistance between the conductors. Alternatively, the monitoring unit can be connected to at least one detector unit which is in turn connected to the conductors of an elongate sensor.

Detecting connectivity or conductivity between the conductors at only one end of each of the conductors, as shown in FIGS. 1 and 2, can allow for detection of a single location of moisture or corrosion. By periodically monitoring connectivity between conductors, a period where moisture was present can be determined and therefore a risk of corrosion can be estimated. Such periodical monitoring can be continuous, i.e. periodical continuous monitoring, such as taking measurements at a set frequency, such as every minute, or every 5 minutes or every 15 minutes or every hour for example. Alternatively, periodical continuous monitoring can be taking measurements for complete cycles, such as a day, or a start-up cycle or a shut-down cycle to capture changes in moisture due to changes in ambient and/or operating conditions.

Measuring resistance between the conductors can give an indication of not only the location (through sufficient conductivity to provide connectivity), but also the severity of moisture or corrosion (with increasing conductivity i.e. decreasing resistance). By periodically continuously monitoring the resistance between the conductors it is again possible to determine the period for which moisture was present and therefore, the likelihood of corrosion occurring. Also, more water and/or more corrosion such as iron oxide in water, would result in lower resistance readings and therefore provide an indication of increased severity of corrosion present.

The resistance, impedance and/or capacitance of the moisture is dependent on the volume of fluid, i.e. the actual contact area, the conductivity of the fluid, which can change with the number of metal ions present in the fluid, and also the number of locations of fluid. This variability of conductivity can make detecting location using only resistance across a pair of wires or multiple similar wires inaccurate or unfeasible. However, with the alternating portion wires of the elongate sensor, if resistance, impedance and/or capacitance is periodically continuously monitored, the initial occurrence of moisture within a sensor portion can be detected, then subtracted from later resistance, impedance and/or capacitance measurements to indicate change in severity, or particularly where resistance, impedance and/or capacitance between conductors is measured at both ends of the elongate sensor, additional locations of moisture or corrosion can be identified or predicted locations of moisture or corrosion can be double-checked.

Figure 3:
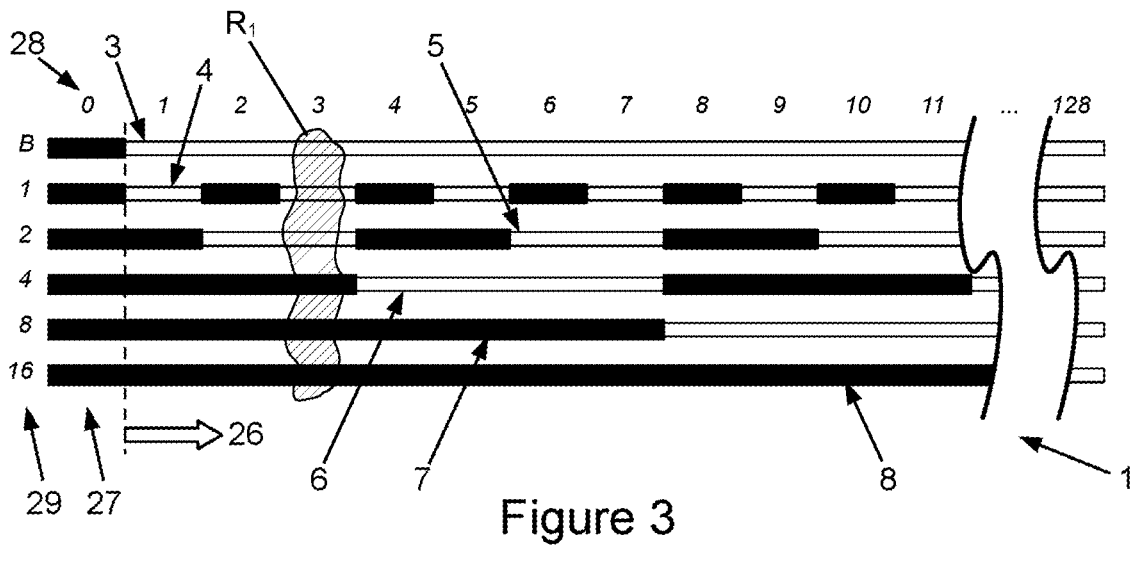
FIG. 3 is a diagrammatic representation of the elongate sensor of FIG. 1, having a patch of moisture or corrosion of resistivity $R_1$.
Figure 4:
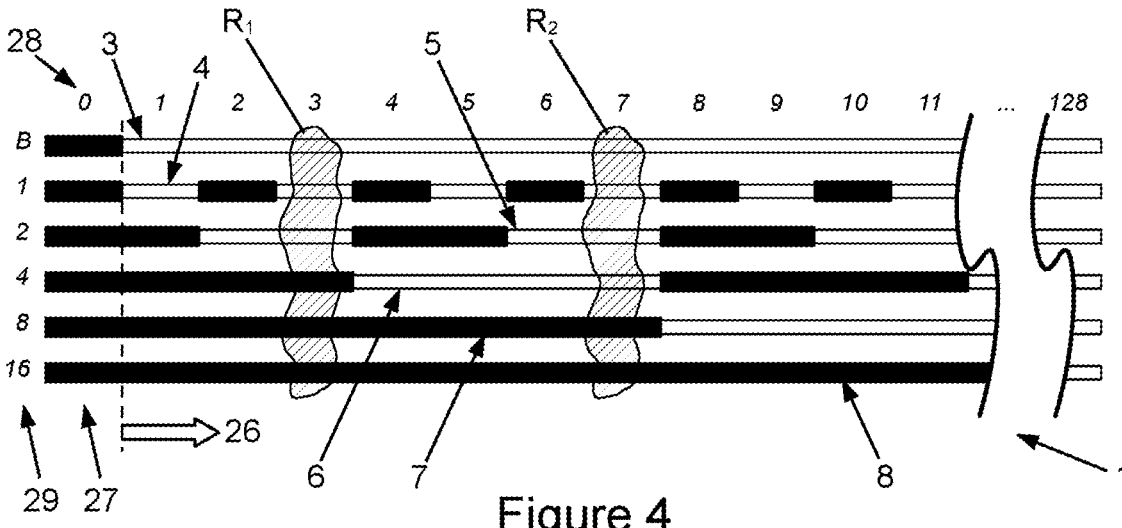
FIG. 4 is a diagrammatic representation of the elongate sensor of FIG. 3, having the first patch of moisture or corrosion of resistivity $R_1$ and a second patch of moisture or corrosion of resistivity $R_2$.
Figure 5:
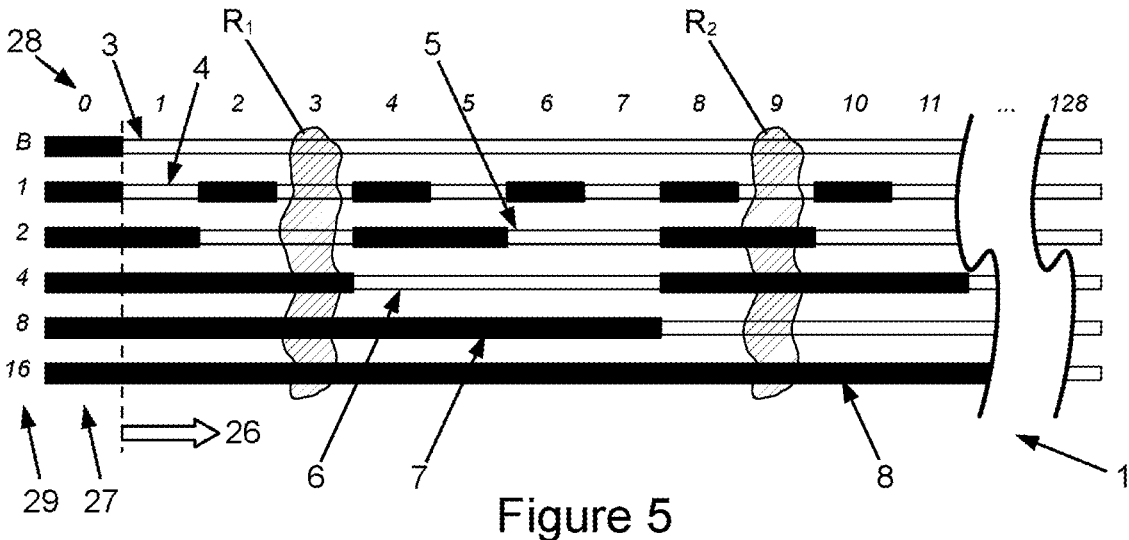
FIG. 5 is a diagrammatic representation of the elongate sensor of FIG. 1, having a first patch of moisture or corrosion of resistivity $R_1$ and a second patch of moisture or corrosion of resistivity $R_2$ at a different location.

FIGS. 3 to 5 show a portion of an elongate sensor 1 having five alternating portion conductors 4, 5, 6, 7, 8 and a base conductor 3, as shown in FIG. 1. As five alternating portion conductors can provide a binary count of up to one hundred and twenty-eight, the decimal scale 28 can be seen for the portions that are shown, with the portions from twelve to one hundred and twenty-seven being in the cut in the drawing.

In FIG. 3, the patch of moisture that was numbered 30 in FIGS. 1 and 2 is now referenced $R_1$ and is located in the third region along the elongate sensor, i.e. in first unit length number three from the start of the sensing region 26. The first patch of moisture or corrosion $R_1$ therefore provides conductivity to the first and second alternating portion conductors, having base-1 and base-2 respectively, providing an indication of conductivity in the region with unit count three. This first patch of moisture or corrosion has resistivity R-between each of the conductors. Therefore, there is a resistance of $R_1$ between the first and second alternating portion conductors, but essentially open circuit or infinite resistance between any other pair of the alternating portion conductors including at least one of the third, fourth or fifth conductors 6, 7, 8 which are insulated through region three on the scale 28, i.e. at the first unit length number three.

The actual resistance measured at the zero portion 27 between the first and second conductors 4 and 5 is the resistance $R_1$ plus the resistance due to the length of conductor from the zero portion to unit length three of each of the first and second conductors 4 and 5. The resistance per unit length of the conductor can be relatively low, for example if a conductor comprises a 0.25 mm diameter stainless steel wire (alternately enamel coated for insulation) it would provide a resistance of approximately one ohm per metre. So, if the patch of moisture or conductivity $R_1$ is near the zero portion end of the elongate sensor, then measuring resistance between the wires at the zero portion end would add very little resistance. But if resistance is measured between the conductors at the opposite end near unit length 128, there would be a far greater length of conductor included in the resistance measurement, giving a larger resistance measurement than when measuring at the zero portion end of the elongate sensor. If, for example, the unit length was four meters, then the resistance at the zero end would be $R_1$+twenty-four ohms (from the 4 metres unit length, and 3 of those unit lengths on each of 2 conductors), whereas the resistance from the 128 end would be $R_1$+1000 ohms (from the 4 metres unit length, 125 unit lengths on each of 2 conductors and the example of one ohm per metre of conductor).

By measuring the resistance between a pair of conductors at the zero end of the elongate sensor and at the opposite end (in this case after unit length 128) and comparing the two measurements, knowing the unit resistance of the conductors, it is possible to determine the approximate location of the patch of moisture or corrosion Rt generating the bridging resistance between the conductors.

Also, as the resistance of the conductors (for example one hundred and twenty-eight ohms for the entire length of each conductor) is typically much lower than the resistance $R_1$ due to the patch of moisture or corrosion (for example approximately forty thousand ohms for a sample patch of water), so the location of the patch of moisture or corrosion can be determined. The resistance provided by the patch of moisture or corrosion $R_1$ between the conductors is typically substantially consistent, i.e. all conduction, or the resistance between any pair of conductors at patch $R_1$ is generally the same value, due to the close proximity of all conductors in the elongate sensor.

This approach, measuring the resistance between pairs of conductors at each end of the elongate sensor also allows the location of multiple patches of moisture or corrosion to be determined, independent of the actual resistance at each location. This is based on the resistance across the relatively small tape of wires (i.e. between the exposed or detecting portions of the conductors) at any given location being substantially consistent, allowing all conduction, impedance or capacitance at that location to be assumed to be the same value.

FIG. 4 shows for example a first patch of moisture or corrosion $R_1$ and a second patch of moisture or corrosion $R_2$. So measuring from either end of the elongate sensor 1 between the first alternating portion conductor 4 and the second alternating portion conductor 5 gives a total resistance of $1/(1/R_1+1/R_2)$, ignoring the relatively low resistance of the conductors themselves, for simplicity, as the two patches provide two separate resistors in parallel between the first and second conductors 4 and 5. For simplicity of explanation, if $R_1$ and $R_2$ are similar, then the resistance between conductors 4 and 5 reduces to half of $R_1$. Measuring from either end of the elongate sensor 1 between the second alternating portion conductor and the third alternating portion conductor 6 gives a total resistance of $R_2$, again ignoring the (typically relatively low) resistance of the conductors themselves for simplicity.

The resistance between any other pair of the conductors, including at least one of the fourth and/or fifth conductors 7 and 8, would be essentially infinite as those conductors are insulated in the vicinity of $R_2$. Based on these readings is it possible to determine that there are two locations of moisture or corrosion and that the wires with the lower resistance (half $R_1$) correspond to region three and the reading $R_2$ indicating the other location is at region seven as shown in the scale 28.

FIG. 5 again shows for example the first patch of moisture or corrosion $R_1$ with the second patch of moisture or corrosion $R_2$ in a different location to that shown in FIG. 4. In this example measuring adjacent or sequential pairs of conductors only provides a resistance measurement of $R_1$ between the first and second conductors 3 and 4. However, measuring the resistance between the first and fourth conductors 3 and 6 gives the resistance of $R_2$ therebetween. However, measuring any other pair of the alternating portion conductors would provide an essentially infinite resistance.

For example, it is possible to detect which of the alternating portion conductors have continuity with the base conductor, due to a patch of moisture or corrosion. Then measuring the resistance between pairs of all the alternating portion conductors which have said continuity between themselves and the base conductor 3 can enable multiple patches of moisture or corrosion to be individually detected.

Locations of more than two patches of moisture or corrosion can be more accurately individually detected, or verified, by measuring the resistance between each pair of conductors at the first end of the elongate sensor (such as at the zero portion or before the start of the sensing region 26) and again at the opposite end (after unit length one hundred and twenty-eight in FIG. 5). As the first patch of moisture or corrosion $R_1$ is near the first end of the elongate sensor, the resistance between the first and second conductors 4 and 5, measured at the first end of the elongate sensor, would be lower than the resistance between the first and second conductors 4 and 5, measured at the second end of the elongate sensor.

If the unit length is, for example, 4 metres, and the second patch of moisture or corrosion is, as in FIG. 5, at location nine, i.e. between thirty-two to thirty-six metres from one end, and if the conductor resistance is one ohm per metre, then when measuring between the base conductor 3 and the fourth conductor 8 at the first end, then at the second end, the difference between the resistance readings at either end would be approximately eight hundred and eighty-eight ohms (being two times the length of the conductor, minus four times the distance from the first end to the location, multiplied by the conductor resistance per first unit length). Therefore, irrespective of the resistance of the moisture or corrosion, the location of at least one defect can be determined by subtracting the difference in resistance measured from one end to the other from twice the total conductor resistance and dividing that by four times the conductor resistance per first unit length.

For the most common case, where the resistance at the moisture or corrosion location is similar for all locations, the number of locations where moisture or corrosion exists along a given pair of conductors can be determined by taking the integer of a percentage (preferably one-hundred and ten percent) of twice the total conductor resistance divided by the difference between the resistance measured from one end to the other. The percentage used may vary for some applications, but is typically between one-hundred percent and one-hundred and thirty percent.

The resistance comparison can be performed between the base conductor and any of the other conductors or it can be performed between pairs of conductors, with the base conductor disconnected. In this manner it is possible to identify unique locations from multiple moisture or corrosion locations using a combination of the above methods. This then allows, through a process of elimination, a complete assessment of the location of all moisture or corrosion locations.

This process can provide or generate the location or position of all incidences of moisture or corrosion, before any remedial actions are taken, irrespective of the number of locations or the variation in resistance of different locations. In some cases, it is possible that large variations in resistance can affect the results, but in cases where the elongate sensor characteristics are not significantly mis-matched to the specific situation, the system is not significantly affected by variations in the resistance at different locations.

Although the example is given above of conductor resistance being approximately one ohm per metre, it could be higher resistance per unit length, or even lower resistance per unit length. Using resistance between the pairs of conductors at a first end of the elongate sensor compared to the resistance of the same pairs of conductors at a second opposite end of the elongate sensor may not necessarily provide the same accuracy for the location of each of multiple patches of moisture or corrosion as using the binary encoding of the detecting and non-detecting portions of the alternating portion conductors (such as the first, second, third, fourth and fifth conductors in FIGS. 1 to 5). However, the resistances $R_1$, $R_2$ and so on, detected when multiple patches of moisture or corrosion are present, can be used to assist in confirming location and to rank the severity of the detected patches.

Alternatively, if it is difficult to distinguish which exact locations are active (i.e. indicating moisture or corrosion at a particular time), it is possible to start at the furthest location, strip insulation or other coverings as necessary, inspect and fix the moisture at said location, then move on to the next one, thus working progressively through the locations. Due to the elongate sensor method, the scope of work would be greatly reduced since, for example, if conductors 7 and 8 had infinite resistance, then even without knowing the resistance or conductivity of the other conductors, this would reduce the possible moisture locations to only one quarter of the total length of the elongate sensor.

In all of the above explanation of resistance between conductors due to moisture therebetween, impedance or capacitance can additional or alternatively be used.

The alternating portion conductors, i.e. the first, second, third, fourth and fifth conductors, are preferably resistant to corrosion, such as being made from stainless steel wire for example. Conversely the base conductor can be corrodible. This allows the base conductor to corrode when the moisture and conditions have been conducive to corrosion for a period of time. Multiple corrodible base conductors can be of different diameters in order to estimate rates of corrosion. Alternatively, a corrosion resistant base conductor can be used, either alone, or in combination with one or more corrodible base conductors.

Figure 6:
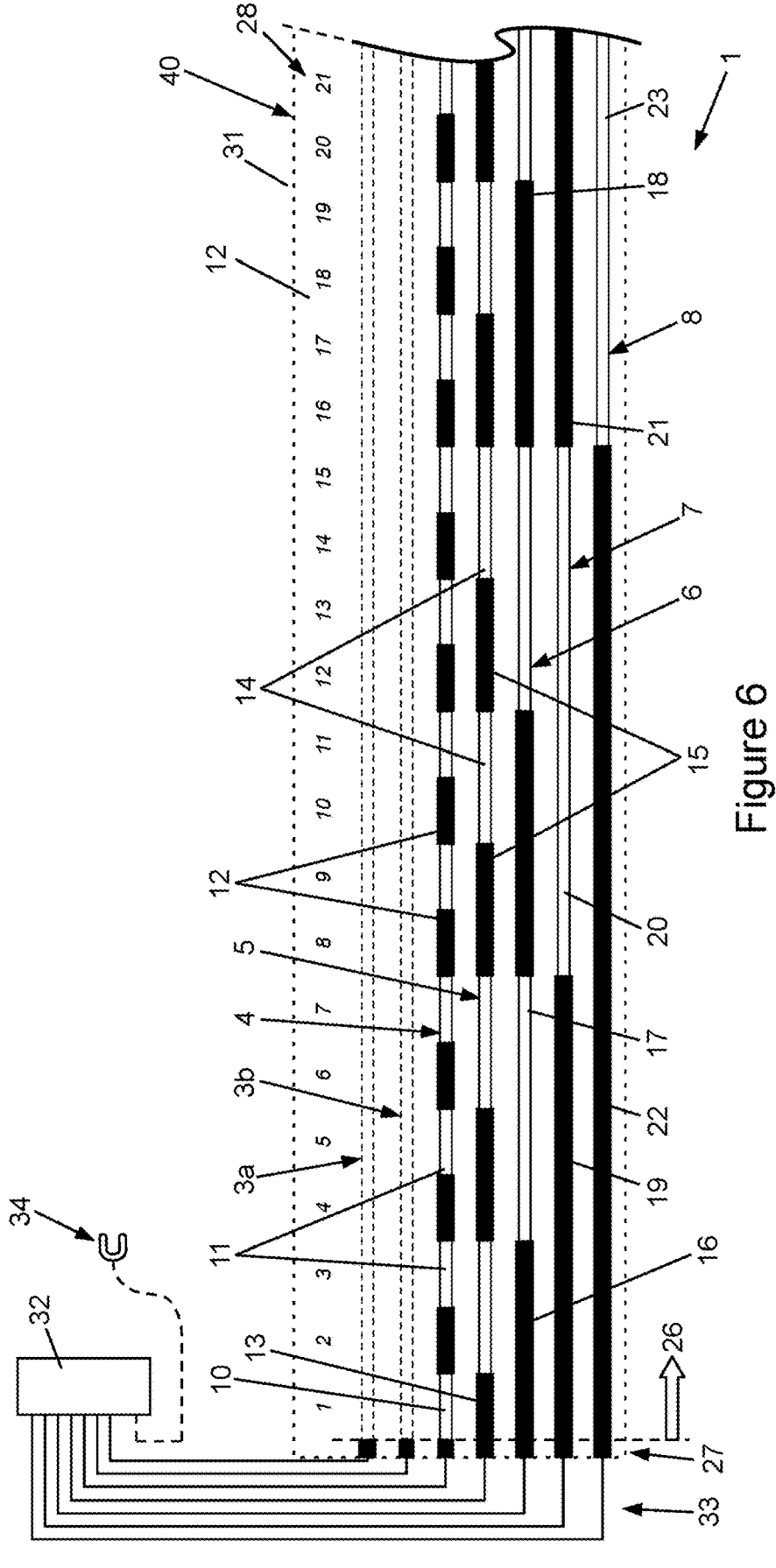
FIG. 6 is a diagrammatic representation of an elongate sensor according to another aspect of the present invention.

Preferably, as shown in FIG. 6, at least one corrosion resistant base conductor 3a is used together with at least one corrodible base conductor 3b.

The at least one corrodible base conductor can comprise additional corrodible wires of varying size, included in the elongate sensor, with the corrosion rate of the object determined by the time taken for the corrodible wires of the elongate sensor to corrode through, i.e. to lose continuous conductivity from one end to the other.

The object (particularly when it is a pipe) can be used as a further base conductor. As pipes are typically earthed to ground, an optional external connector 34 (shown with a dashed connection line) can be provided to connect to either the object or to ground. This can enable an object such as a pipe to be used as the further base conductor.

The conductors are typically wires and the insulated (or non-detecting) portions of the conductors are typically enamel coated. However other possible constructions of the conductors having alternating insulated and non-insulated portions are envisaged. For example, the insulated portions of a conductor can be formed by a polymer insulation.

Alternatively, as shown in FIG. 6, the non-conductive carrier material can be a nonconductive strip or tape 40 onto which the individual conductors are bonded, adhered or printed. The non-detecting portions of each conductor can then be printed or otherwise covered over with non-conductive material.

The conductors can be individual wires of different resistance (either different materials or different cross sections) as this can improve detection of location.

The object for which the sensor or monitoring is used to detect moisture around, or corrosion thereof, is typically a pipe and the covering may be insulation, fireproofing, a coating or a protective layer such as rubber or the like or a mechanical protection layer, thermosetting plastic layer, refractory or weight layer. The object can alternatively be part of a structure for example, either where corrosion could lead to structural weakness, or to indicate a leak or a problem leading to unwanted moisture ingress in or around the structure. The object can alternatively be multiple hospital beds or other articles where any moisture present on the individual article is of interest, but the position on the individual article less so, for example. In this case, one hundred and twenty seven articles could be monitored using an eight channel monitoring system and an eight wire cable, which is preferable compared to two wires for each of the one hundred and twenty seven beds, i.e. two hundred and fifty four wires and one hundred and twenty seven monitoring channels.

The object being monitored for corrosion can be coated with a protective coating such as paint or a corrosion resistant coating, and then surrounded in a covering such as insulation or fireproofing. The elongate sensor can be fitted under the covering, but over the coating (for example, between the paint and the insulation), to monitor where moisture accumulates under the covering prior to coating failure, indicating regions where covering repairs are required. Once the coating has failed or is breaking down, the object (such as a pipe or structure) will start to corrode. At that point conductivity between the elongate sensor and the object itself will become evident. This has the advantage that the elongate sensor can determine the presence and location of moisture prior to corrosion and then also identify the time of initiation of corrosion. In this manner it is possible to risk rank the elongate sensor signals based on a known corrosion commencement date and time where corrosion is active (moisture is present). Alternatively, if the object has a coating, even without a covering (such as a pipe with paint but no insulation or fireproofing), the elongate sensor can be fitted over the protective coating to monitor break-down of the protective coating. Alternatively, the elongate sensor can be fitted to the pipe before it is painted, so the elongate sensor can be fitted under the corrosion preventative coating and under any covering present (such as insulation or fireproofing, if any).

Where the object is a pipe or structural member having a vertical or non-horizontal portion, the elongate sensor is preferably wound around the vertical or non-horizontal portion. Where the object is a pipe or structural member having a substantially horizontal or non-vertical portion, the elongate sensor is preferably located along the underside of the object, following a lowest point of a section of the object where moisture is most likely to collect. Where the object has a bend or an elbow between a vertical or non-horizontal portion and a horizontal or non-vertical portion, the elongate sensor is preferably located under the elbow against the object in a region to which any moisture from the vertical or non-horizontal portion may seep, trickle down, collect or accumulate.

As well as being placed against the bottom of a pipe along preferably all of the length of the pipe, or being spiraled around vertical portions of the pipe, the elongate sensor is preferably also placed under or spiraled around small-bore take-offs and dead-legs.

A similar elongate sensor can be used offset in position to the first elongate sensor. For example, a second elongate sensor can be used in parallel with the first elongate sensor to provide improved moisture detection and/or greater accuracy of the locations of moisture detected. If the first elongate sensor is spiraled around an object, the second elongate sensor can be spiraled around the object offset one hundred and eighty degrees around the object to improve the surface area covered, or more elongate sensors used in parallel to further improve the surface area covered. Alternatively, a second elongate sensor can be used slightly offset from the first elongate sensor to improve location accuracy. Alternatively, a second elongate sensor can be installed in the opposite direction to the first elongate sensor to potentially improve accuracy of location of multiple positions of moisture or corrosion on the object.

By measuring the resistance between conductors, multiple elongate sensors can be used in series to monitor a larger length of pipe, pipeline or other object, whilst still allowing determination of the exact location of the moisture or corrosion. In this manner entire cross-country pipelines, for example, can be monitored.

Where multiple elongate sensors are used in series, a respective resistor can optionally be added between at least one of the conductors of a first elongate sensor and the equivalent conductor of a second elongate sensor to assist in the determination of the location of the moisture or corrosion. Resistors can be used between one or more of the equivalent conductors of each elongate sensor in the series.

Where the elongate sensor is being used to monitor for, or detect, degradation of the pipe protective coating or corrosion due to degradation of the protective coating, the elongate sensor can be spiraled around the pipe or object.

Sets of two elongate sensors can be used rather than a single elongate sensor for any individual length of object. For example, two elongate sensor sets can be wrapped spirally around a pipeline under the protective coating or above the protective coating in order to monitor for conductivity and/or reducing resistance between the conductors of the elongate sensors and the pipeline.

An elongate sensor and/or a system incorporating such an elongate sensor provides many advantages. For example, it can allow proactive repair of insulation, due to early detection of water. It can eliminate the risk of not detecting water, due to monitoring of the entire system that the elongate sensor is installed on. It allows only necessary local repairs to be performed, due to identifying, to within the first unit length, the location of the water ingress, whereas normally the whole line or sections of the line have to be stripped of insulation to find if there is or isn't a problem. Periodical continuous monitoring can allow determination of the risk of corrosion, based on time spent with moisture present. It allows ongoing monitoring of the occurrence of corrosion, via decreasing resistance between conductors and also decreasing resistance between the conductors and the object. Locations along the object can be risk ranked based on time spent wet and based on relative resistivity. Very long lengths can be monitored with the addition of conductors and/or multiple sections of identical elongate sensors, with either the whole system monitored globally, or each section monitored individually.

The shortest identifiable portion of the elongate sensor is determined by the first unit length, i.e. the length of each non-insulated portion or insulated portion on the first conductor where the first conductor is the conductor having the shortest length of alternating insulated and non-insulated portions. The length of object that is able to be monitored by a single elongate sensor can be adjusted by changing the number of conductors (for example adding a sixth or base 32 conductor to FIG. 1 or 2) and/or by changing the first length. As the lengths of each insulated and of each non-insulated portion of each conductor are double the lengths of each insulated and each non-insulated portion of the preceding conductor, changing the first unit length on the first conductor changes the length of the second unit length on the second conductor and so on. However, changing the first unit length does change the shortest identifiable portion of the elongate sensor, i.e. the resolution in metres (or similar standard measurement of length) of the elongate sensor.

Preferably the first unit length of the elongate sensor is between one and four metres, such as one metre, two metres or four metres, but can be less than one metre or greater than four metres.

It should be understood that the Figures are not to scale. For example, if a typical conductor diameter is less than one millimetre and the typical first unit length is between one and four metres, then the first unit length is many thousands of times longer than the diameter of each of the conductors, rather than the only five and a half times longer in the Figures.

Preferably each elongate sensor includes between four and eight of the alternating portion conductors (such as the five alternating portion conductors 4, 5, 6, 7, 8 shown in FIGS. 1 and 2) plus any non-insulated base conductors and corrodible conductors (such as the base conductor 3 in FIG. 1). But greater than 8 conductors can be used to facilitate monitoring of longer lengths.

The elongate sensor can alternatively be formed by printing the conductors onto a non-conductive strip or non-conductive tape, including printing insulative material over portions of the conductors to form the non-detecting portions for each conductor.

The non-conductive material such as a tape or a weave of non-conductive threads for example, must not only hold the conductors (including any base conductors) close together, while preventing direct electrical contact therebetween, permit ingress of conductive media and prevent direct electrical contact of the conductors with conductive external surfaces, it should also substantially prevent axial movement of the conductors relative to each other. Most particularly it should substantially prevent axial movement between any of the alternating portion conductors (i.e. the first conductor, second conductor, third conductor, etc.). This is due to the binary encoding characteristic provided by the alternating portion conductors, which would not function correctly if the alternating portion conductors moved axially relative to each other.

The system of the present invention typically comprises at least one elongate sensor, the measurements from which are input to or acquired by a monitoring system or monitoring unit. The monitoring unit can then over time generate risk locations and priorities for maintenance locations.

The system can include a detecting unit for the or each elongate sensor or each elongate sensor set where sensors are used in series for example, the detecting unit measuring the resistances between the pairs of conductors of the sensor.

As resistance increases, conductivity reduces. It is preferable that where conductivity is present, or determined to be present, the resistance is less than a chosen resistance. For example, it can be assumed that conductivity is present where resistance is less than $10^9\Omega$, i.e. less than ten to the ninth power, or <1,000,000,000 or less than one thousand million Ohms. This number is arbitrary, so the number stated here is given only as one possible example of the chosen resistance.

FIG. 7 shows a flow chart of a method 50 according to one aspect of the present invention. The method begins with the step 51 of providing an elongate sensor of a type described above. That is, providing an elongate sensor for detecting moisture or corrosion on an object, the elongate sensor including at least first, second, third, fourth and fifth conductors, each conductor having alternating detecting and non-detecting portions, the length of each detecting and each non-detecting portion of the first conductor having a unit length, each $N^{th}$ conductor having detecting portion lengths and non-detecting portion lengths of $2^{(N-1)}$ times the unit length, the conductors being located in parallel to each other by an electrically non-conductive carrier material or tape, the conductors being prevented from coming into direct electrical contact with each other or the object, while permitting ingress of conductive media.

The step of providing an elongate sensor can include the step 52 of providing at least one base conductor and/or it can include the steps 53 of providing at least one external connector and step 54 connecting the external connected to the object or to ground. As discussed above, when the object is a pipe, the external connector can for example be connected to the pipe, or if the pipe is grounded, the external connector can be connected to ground.

In the step 52 of providing at least one base conductor, the or each base conductor being uninsulated, but being located in parallel to each other and prevented from coming into direct electrical contact with each other while permitting ingress of conductive media.

The next step 55 is installing the elongate sensor is adjacent the object. Where the object has a covering such as insulation, the sensor is preferably installed adjacent the object, under the covering. If the pipe has a coating, the sensor can be installed under the coating, or if there are multiple layers of coating and/or covering, the elongate sensor can be installed between the layers of coatings and/or coverings.

When monitoring for connectivity 56 between the base conductor and at least the first, second, third, fourth and fifth conductors, any connectivity indicates the presence of moisture, so in step 57 if there is no connectivity, there is no moisture or corrosion detected on the object, so the method proceeds to a pause then repeat step 58.

However, if in step 57 there is any connectivity, then it is determined that there is a presence of moisture or corrosion on the object. The connectivity of the different conductors of the elongate sensor can be used to identify 59 the location or position of the moisture, particularly if there is just a single location or position of moisture. The binary encoding nature of the elongate sensor simply needs to be interpreted to identify 59 the location or position of moisture. However, if there are multiple locations or positions of moisture, the step 60 of measuring a resistance, capacitance and/or impedance between the conductors can be used in step 61 to identify the number of locations and/or the positions of multiple locations of moisture or corrosion on the object.

Whether one or multiple locations of moisture or corrosion have been detected, step 62 outputs the position of the locations. Even if moisture has been detected, the method can proceed after outputting any positions, to the pause and repeating step 58. In step 58, the pause may be for a predetermined length of time, or the pause may be for a length of time that is determined by environmental conditions, operating conditions or the like.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. An elongate sensor for a system for detecting moisture and/or corrosion, the elongate sensor including at least a first conductor, a second conductor and a third conductor, each of the at least first, second and third conductors being located in parallel to each other by an electrically non-conductive carrier material to prevent the conductors from coming into direct electrical conductive contact with each other or external conductive surfaces, while permitting ingress of conductive media;

the first conductor being exposed or electrically non-insulated for a first unit length forming an initial first detecting portion, then alternately being electrically insulated for a distance equal to the first unit length forming first non-detecting portions or being electrically non-insulated for a distance equal to the first unit length forming additional first detecting portions of the first conductor;

the second conductor being electrically insulated for a distance equal to a second unit length minus the first unit length forming an initial second non-detecting portion, then alternately being electrically non-insulated for a distance equal to the second unit length forming second detecting portions or being electrically insulated for a distance equal to the second unit length forming additional second non-detecting portions of the second conductor, the second unit length being double the first unit length;

the third conductor being electrically insulated for a distance equal to a third unit length minus the first unit length forming an initial third non-detecting portion, then alternately being electrically non-insulated for a distance equal to the third unit length forming third detecting portions or being electrically insulated for a distance equal to the third unit length forming non-detecting portions of the third conductor, the third unit length being double the second unit length.

2. The elongate sensor according to claim 1, wherein the at least a first conductor, a second conductor and a third conductor further includes a base conductor, the base conductor being exposed or non-insulated and being located parallel to the first, second and third conductors by the non-conductive material.

3. The elongate sensor according to claim 2, further including at least one additional base conductor, wherein the additional base conductor or each additional base conductor is corrodible.

4. The elongate sensor according to claim 1, wherein at least one of the at least a first conductor, a second conductor and a third conductor further includes a resistor in series with the respective conductor.

5. The elongate sensor according to claim 1, wherein at least one of the at least a first conductor, a second conductor and a third conductor further includes at least two resistors in series with the respective conductor, equispaced along the respective conductor.

6. The elongate sensor according to claim 1, wherein the first unit length is up to and including 4 metres.

7. The elongate sensor according to claim 1, wherein the elongate sensor is held, adhered or fixed under a substantially horizontal object and/or spiraled around a substantially vertical object.

8. The elongate sensor as claimed in claim 1, including a fourth conductor;

the fourth conductor being electrically insulated for a distance equal to a fourth unit length minus the first unit length forming an initial fourth non-detecting portion, then alternately being electrically non-insulated for a distance equal to the fourth unit length forming fourth detecting portions or being electrically insulated for a distance equal to the fourth unit length forming fourth non-detecting portions of the fourth conductor, the fourth unit length being double the third unit length.

9. The elongate sensor as claimed in claim 8, including an Nth conductor;

the Nth conductor being electrically insulated for a distance equal to an Nth unit length minus the first unit length forming an initial Nth non-detecting portion, then alternately being electrically non-insulated for a distance equal to the Nth unit length forming Nth detecting portions or being electrically insulated for a distance equal to the Nth unit length forming Nth non-detecting portions of the Nth conductor, the Nth unit length being $2^{(N-1)}$ times the first unit length.

10. The elongate sensor according to claim 1, wherein the non-conductive carrier material and the conductors are woven together.

11. The elongate sensor according to claim 1, wherein the non-conductive carrier material is a strip or tape to which the conductors are fastened or printed.

12. The elongate sensor according to claim 1, including a detector unit connected electrically to each conductor.

13. A system for detecting moisture and/or corrosion of an object, the system including at least one elongate sensor and a monitoring unit:

the elongate sensor including at least a first conductor, a second conductor and a third conductor, each of the at least first, second and third conductors being located in parallel to each other by an electrically non-conductive carrier material to prevent the conductors from coming into direct electrical conductive contact with each other or external conductive surfaces, while permitting ingress of conductive media;

the first conductor being exposed or electrically non-insulated for a first unit length forming an initial first detecting portion, then alternately being electrically insulated for a distance equal to the first unit length forming first non-detecting portions or being electrically non-insulated for a distance equal to the first unit length forming additional first detecting portions of the first conductor;

the second conductor being electrically insulated for a distance equal to a second unit length minus the first unit length forming an initial second non-detecting portion, then alternately being electrically non-insulated for a distance equal to the second unit length forming second detecting portions or being electrically insulated for a distance equal to the second unit length forming non-detecting portions of the second conductor, the second unit length being double the first unit length;

the third conductor being electrically insulated for a distance equal to a third unit length minus the first unit length forming an initial third non-detecting portion, then alternately being electrically non-insulated for a distance equal to the third unit length forming third detecting portions or being electrically insulated for a distance equal to the third unit length forming non-detecting portions of the third conductor, the third unit length being double the second unit length;

the monitoring unit being connected to each of the at least first, second and third conductors individually and being configured to detect electrical conductivity between any pair of the at least first, second and third conductors.

14. The system as claimed in claim 13, further including a base conductor wherein the monitoring unit is configured to detect electrical conductivity between any pair of the conductors, including the base conductor and the at least first, second and third conductors.

15. The system as claimed in claim 14, wherein the base conductor is included in the elongate sensor, is non-insulated and is located parallel to the at least first, second and third conductors by the non-conductive carrier material, to prevent direct electrical contact with the conductors or any external surfaces and to permit ingress of conductive media.

16. The system as claimed in claim 14, wherein the elongate sensor is spiraled around or held adjacent or against an underside of an object, the object being conductive and forming the base conductor.

17. The system as claimed in claim 14, wherein the monitoring unit converts detected electrical conductivity between the base conductor and the at least first, second and third conductors into a decimal number of first unit lengths or into a distance.

18. The system as claimed in claim 14, wherein the monitoring unit detects electrical resistance, impedance and/or capacitance between individual pairs of the conductors, and determines a location of at least one position or region of corrosion or moisture.

19. The system as claimed in claim 18, wherein the monitoring unit is connected to a first end and a second end of each of the conductors and detects and compares electrical resistance, impedance and/or capacitance measured from the first end to electrical resistance, impedance and/or capacitance measured at the second end.

20. The system as claimed in claim 13, wherein the monitoring unit is directly connected to the conductors of the elongate sensor.

21. The system as claimed in claim 13, wherein the monitoring unit is indirectly connected to the conductors of the elongate sensor, the elongate sensor including a detector unit, the monitoring unit being connected to the detector unit of the elongate sensor.

22. The system as claimed in claim 13, wherein monitoring unit obtains a reading from the elongate sensor at a predetermined interval of time.

23. The system as claimed in claim 13 wherein the monitoring unit converts detected electrical conductivity between the pairs of conductors, into a decimal number of first unit lengths or into a distance.

24. The system as claimed in claim 13, further including a base conductor, the base conductor being an additional conductor in the elongate sensor or being the object, wherein the monitoring unit is configured to measure an electrical resistance, impedance and/or capacitance between individual pairs of the conductors, including the base conductor and the first, second and third conductors.

25. The system as claimed in claim 24 wherein the monitoring unit converts electrical resistance, impedance and/or capacitance between the pairs of the at least first, second and third conductors to determine a location of at least one region of corrosion or moisture.

26. The system as claimed in claim 25, wherein the monitoring unit is connected to a first end and a second end of each of the conductors and detects and compares electrical resistance, impedance and/or capacitance measured from the first end to electrical resistance, impedance and/or capacitance measured at the second end.

27. The system as claimed in claim 13 wherein the sensor monitoring unit periodically measures conductivity and/or resistance, impedance and/or capacitance in the at least one elongate sensor, the sensor monitoring unit logging or tracking the time periods that a detecting portion is detecting moisture.

28. The system as claimed in claim 13 wherein the at least one elongate sensor includes multiple elongate sensors on multiple monitored objects, measured conductivity and/or resistance, impedance and/or capacitance from each sensor being transmitted to the monitoring unit.

29. The system as claimed in claim 13 wherein the at least one elongate sensor is placed underneath a covering on the object.

30. A method of detecting moisture or corrosion on an object, the method comprising:

providing an elongate sensor including at least first, second, third, fourth and fifth conductors, each conductor having alternating exposed or electrically non-insulated detecting and electrically insulated non-detecting portions, the length of each detecting and each non-detecting portion of the first conductor having a unit length, each Nth conductor having detecting portion lengths and non-detecting portion lengths of $2^{(N-1)}$ times the unit length, the conductors being located in parallel to each other by an electrically non-conductive carrier material or tape, the conductors being prevented from coming into direct electrical contact with each other or the object, while permitting ingress of conductive media.

31. The method according to claim 30, wherein providing an elongate sensor includes providing at least one base conductor, the or each base conductor being uninsulated, but being located in parallel to each other and prevented from coming into direct electrical contact with each other while permitting ingress of conductive media.

32. The method according to claim 30, wherein providing an elongate sensor includes providing at least one external connector, the method further including connecting the external connector to the object or to ground, the external connector forming a portion of an external base conductor which forms part of the or a base conductor.

33. The method according to claim 31, including installing the elongate sensor adjacent the object.

34. The method according to claim 33, including monitoring for connectivity between the base conductor and at least the first, second, third, fourth and fifth conductors.

35. The method according to claim 34, including determining a presence of moisture or corrosion on the object:

if no moisture or corrosion is detected on the object, then after a pause of a predetermined time period, the monitoring for connectivity is repeated;

if moisture or corrosion is detected on the object, then calculating and reporting the position of said moisture or corrosion on the object.

36. The method according to claim 34, including determining a presence of moisture or corrosion on the object:

if no moisture or corrosion is detected on the object, then after a pause of a predetermined time period, the monitoring for connectivity is repeated;

if moisture or corrosion is detected on the object, then measuring a resistance, capacitance and/or impedance for any or each connection between the base conductor and the at least the first, second, third, fourth and fifth conductors calculating and reporting at least one position of said moisture or corrosion on the object.

37. The method according to claim 33, including measuring a resistance, capacitance and/or impedance between at least the first, second, third, fourth and fifth conductors;

determining a presence of moisture or corrosion on the object:

if no moisture or corrosion is detected on the object, then after a pause of a predetermined time period, the measuring a resistance, capacitance and/or impedance is repeated;

if moisture or corrosion is detected on the object, then calculating and reporting at least one position of said moisture or corrosion on the object.

\* \* \* \* \*